May 31, 1955 W. S. CHEPIL 2,709,320
APPARATUS FOR EFFECTING THE FECUNDATION OF PLANTS
Filed Feb. 8, 1952 3 Sheets-Sheet 1
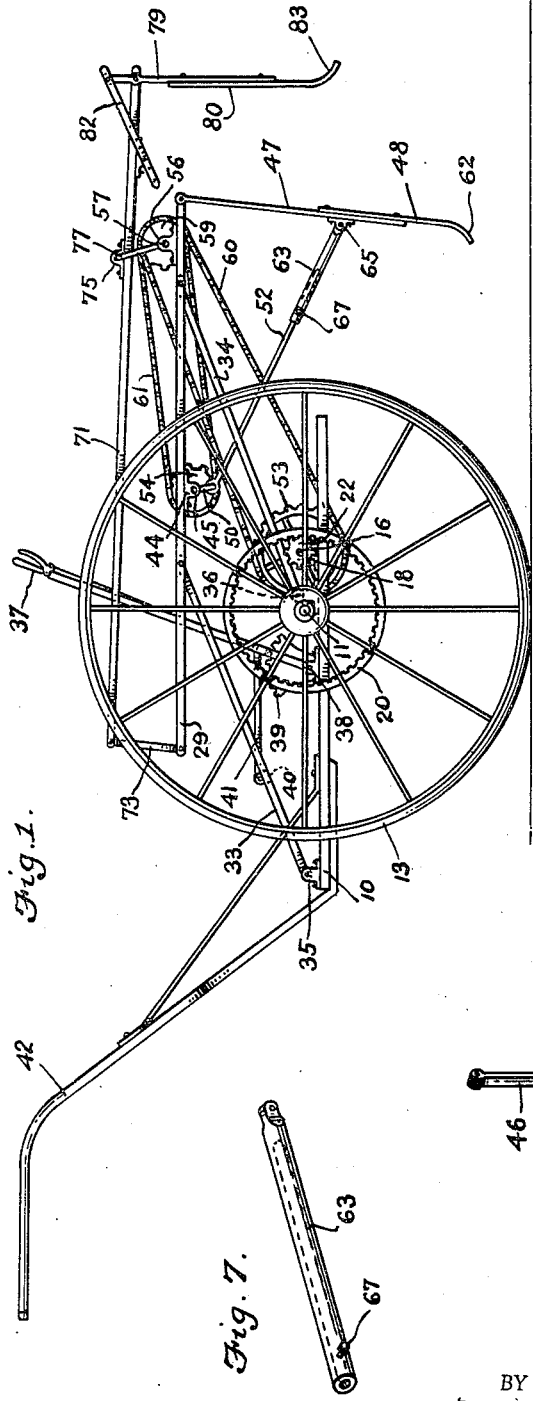
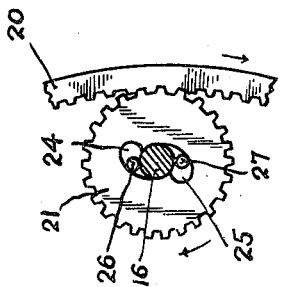
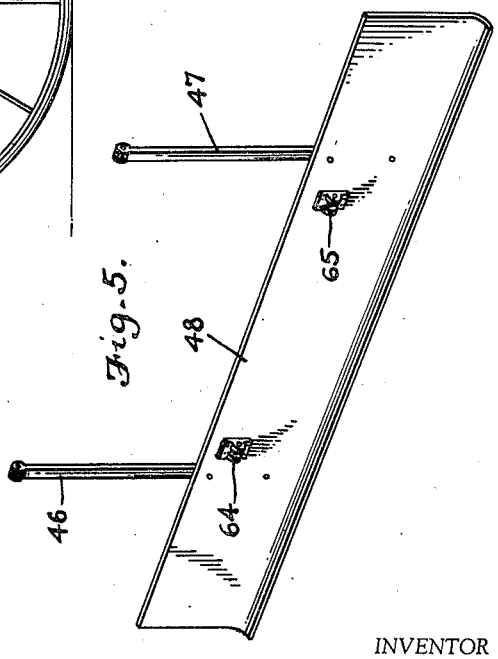
INVENTOR
William S. Chepil
BY
McMorrow, Berman + Davidson
ATTORNEYS

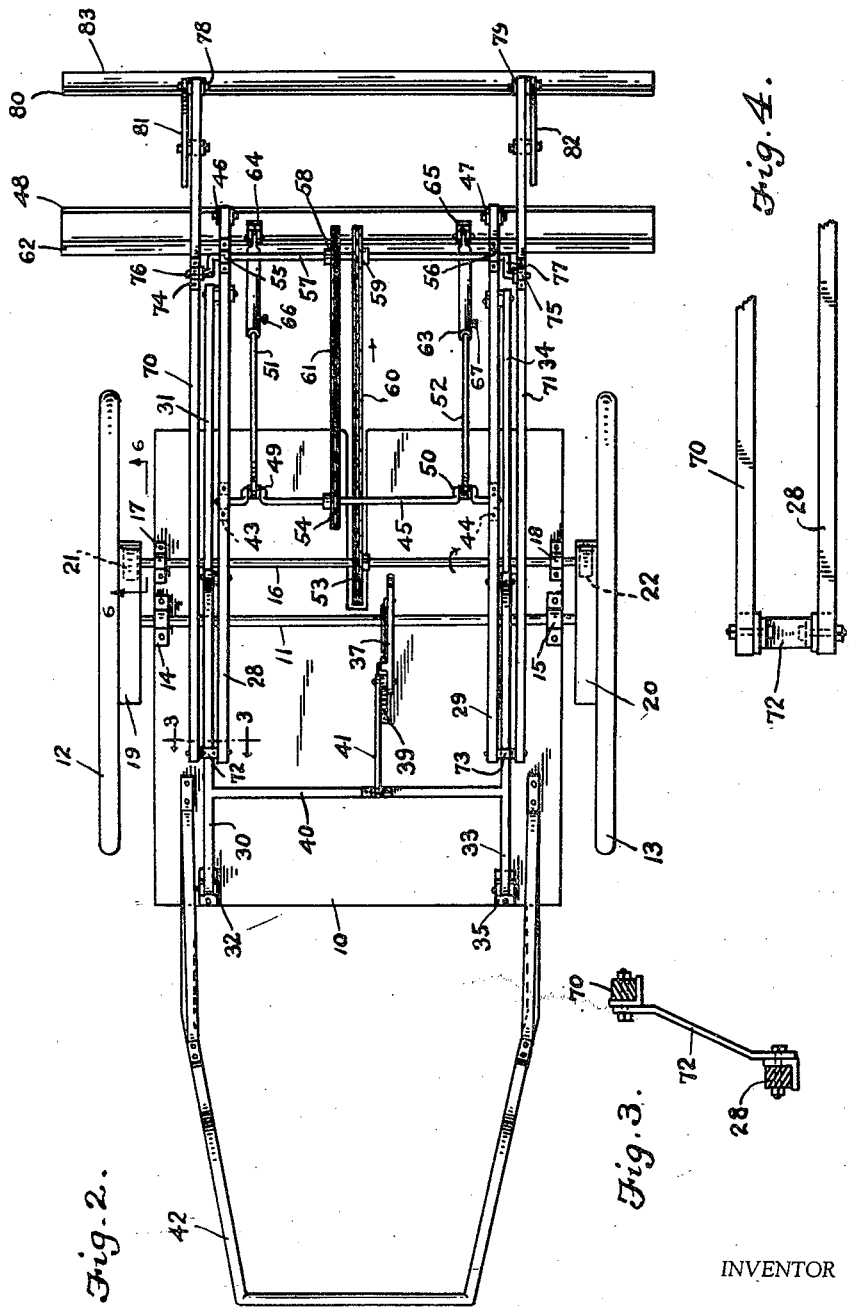

May 31, 1955        W. S. CHEPIL        2,709,320
APPARATUS FOR EFFECTING THE FECUNDATION OF PLANTS
Filed Feb. 8, 1952        3 Sheets-Sheet 3
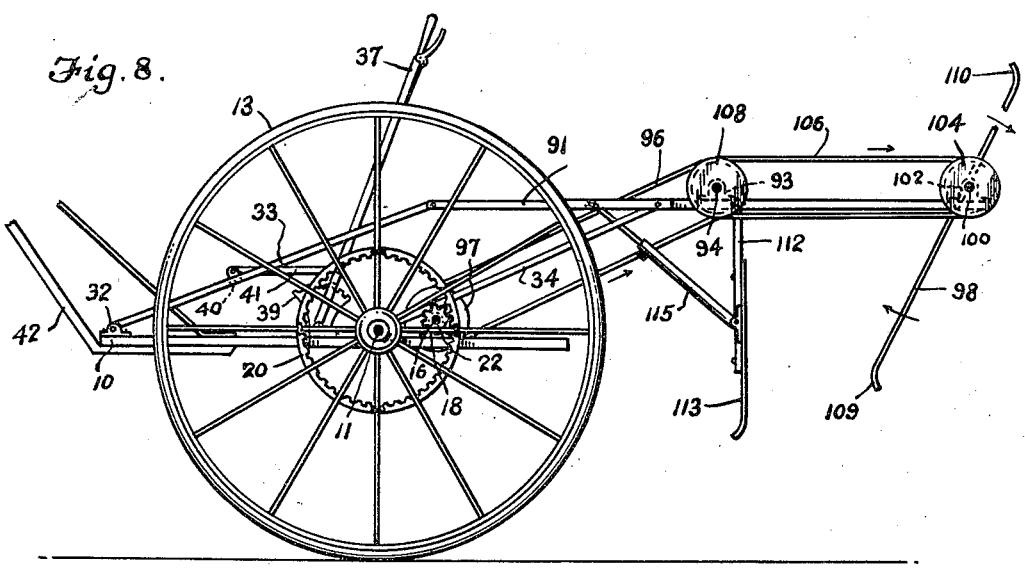
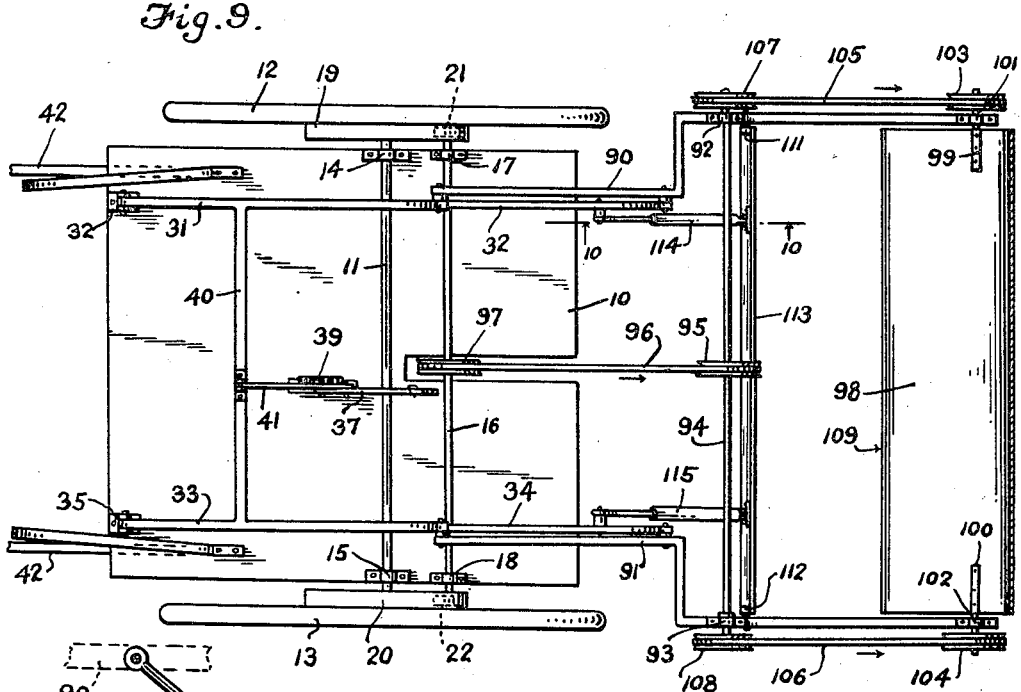
INVENTOR
William S. Chepil
BY
McMorrow, Berman & Davidson
ATTORNEYS

United States Patent Office 2,709,320
Patented May 31, 1955

2,709,320

APPARATUS FOR EFFECTING THE FECUNDATION OF PLANTS

William S. Chepil, Manhattan, Kans.

Application February 8, 1952, Serial No. 270,673

3 Claims. (Cl. 47—1)

This invention relates to an apparatus for effecting the fecundation of certain plants and more particularly to an apparatus for treating the blossoms of certain plants, such as alfalfa, while the blossoms are on the growing plants, to condition the blossoms for cross pollination and the production of fertile seed.

It is among the objects of the invention to provide a method and apparatus for conditioning blossoms on growing plants for cross pollination to produce fertile seed and, more specifically, for tripping alfalfa blossoms to release the staminal column of each blossom from the keel portion of the corolla in which the staminal column is encased by rupturing the keel portion and permitting the staminal column with the pistil to flex to an exposed position to distribute and receive pollen; which involves imparting to the blossoms while on the growing plants blows of sufficient force to rupture the keels of the blossoms, but of insufficient force to sever the blossoms from the plants; which involves imparting the keel rupturing blows to the blossoms by mechanical means including beaters having smooth surfaces contacting the plants and blossoms to avoid damaging the plants or blossoms or cutting the blossoms from the plants; and which method is easy to practice and which apparatus is simple and durable in construction, economical to manufacture and use, and effective and efficient in operation.

Other objects and advantages will become apparent from a consideration of the following description and the appended claims in conjunction with the accompanying drawings wherein:

Figure 1 is a side elevational view of a blossom treating device illustrative of the invention;

Figure 2 is a top plan view of the device illustrated in Figure 1;

Figure 3 is a fragmentary cross sectional view on the line 3—3 of Figure 2;

Figure 4 is a top plan view of the structure illustrated in Figure 3;

Figure 5 is a perspective view of a beater element of the apparatus;

Figure 6 is a fragmentary cross sectional view on the line 6—6 of Figure 2;

Figure 7 is a perspective view of a part of an adjustable length connecting link for one of the beaters;

Figure 8 is a side elevational view of a somewhat modified form of apparatus;

Figure 9 is a top plan view of the modified form of apparatus illustrated in Figure 8; and Figure 10 is a fragmentary cross sectional view on the line 10—10 of Figure 9.

With continued reference to the drawings, the preferred form of the blossom treating device or apparatus comprises a frame 10 of rectangular shape, an axle 11 extending transversely across the upper side of the frame intermediate the length of the latter and projecting at its ends beyond the frame, wheels 12 and 13 mounted one on each end of the axle 11 and disposed adjacent the corresponding sides of the frame 10 and bearing blocks 14 and 15 disposed one adjacent each side of the frame and receiving the axle 11 near the wheels 12 and 13 to mount the axle on the frame for rotation of the former relative to the latter.

A drive shaft 16 extends transversely of the frame 10 adjacent and substantially parallel to the axle 11 and is journaled in bearing blocks 17 and 18 mounted on the frame. Internally toothed ring gears 19 and 20 are mounted one on each of the wheels 12 and 13 at the inner sides of the wheels and gears 21 and 22 are mounted on the drive shaft 16, one at each end thereof and disposed within the ring gears 19 and 20 respectively, with their gear teeth in mesh with the teeth of the corresponding ring gears.

A one-way drive connection is provided between each of the gears 21 and 22 and the drive shaft 16, so that each of the wheels 12 and 13 can rotate in one direction without rotating the drive shaft 16.

As illustrated in Figure 6, gear 21 is provided with cam apertures 24 and 25 disposed at diametrically opposite sides of the drive shaft 16 and drive rollers 26 and 27 are mounted in the cam apertures 24 and 25 respectively, and wedged into driving engagement with the drive shaft 16 when the gear 21 is turned in one direction, these rollers being moved out of driving engagement with the shaft 16 when the gear 21 is turned in the opposite direction.

A pair of bars 28 and 29 are disposed above the frame 10 and extend longitudinally of the frame, one adjacent each side of the latter and struts 30 and 31, of the same length, are connected each at one end to the frame 10 and at its other end to the bar 28. The strut 30 is connected to the frame by a suitable mounting bracket 32 and secured on the frame at the rear edge of the latter and is connected to the bar 28 intermediate the length of this bar, but somewhat nearer the rear than the front end thereof. The strut 31 is pivotally connected to the frame by mounting bracket, not illustrated, disposed concentric with the drive shaft 16, and is connected at its other end to the bar 28 near the front end of this bar.

Struts 33 and 34 are connected each at one end to the frame 10 at the opposite side of the frame from the struts 30 and 31 and are also connected to the bar 29. The strut 33 is connected at one end to the frame by a mounting bracket 35 mounted on the frame adjacent the rear end of the latter and is connected at its other end to the bar 29 intermediate the length of, but nearer the rear than the front end of this bar, and the strut 34 is connected at one end to the frame by a mounting bracket 36 disposed concentric with the drive shaft 16 and is connected at its other end to the bar 29 near the front end of this bar. With this arrangement, the bars 28 and 29 can be raised and lowered relative to the frame 10 and are maintained substantially parallel to the frame at all times. A hand lever 37 is pivotally mounted at its lower end on the frame 10 adjacent the axle 11 by a mounting bracket 38 and a toothed quadrant 39 is mounted on the frame adjacent the lower end of this lever for holding the lever in various positions of angular adjustment relative to the frame in a manner well known to the art. A brace 40 extends between the struts 30 and 33 and is connected at its ends to these struts intermediate the length thereof and a link 41 connects the hand lever 37 to the brace 40, so that the bars 28 and 29 can be raised and lowered by means of the hand lever.

In the arrangement illustrated, a U-shaped handle 42 is connected at its ends to the frame at the rear end and at respectively opposite sides of the latter and extends upwardly and rearwardly from the frame for manually propelling the machine. It is to be understood, however, that other means may be provided for propelling the machine without in any way exceeding the scope of the invention.

Bearing blocks 43 and 44 are mounted on the bars 28 and 29 intermediate the length of these bars, and a crankshaft 45 extends transversely of the space between the bars 28 and 29 and is journaled at its ends in the bearing blocks 43 and 44. Arms 46 and 47 are pivotally connected at their upper ends to the front ends of the bars 28 and 29 and depend from these bars and a beater element 48 in the form of a plate of elongated rectangular shape extends transversely below the bars 28 and 29 and is secured to the lower ends of the arms 46 and 47 for beating blossoming plants over which the machine is propelled.

The shaft 45 is provided with cranks 49 and 50 and adjustable length rods 51 and 52 are connected between the cranks 49 and 50, respectively, and the beater plate 48 to impart a forward and rearward swinging movement to the beater plate when the machine is forwardly propelled.

A chain sprocket 53 is mounted on the drive shaft 16 and a corresponding chain sprocket 54 is mounted on the crankshaft 45. Bearing blocks 55 and 56 are mounted on the bars 28 and 29 near the front ends of these bars, and a second crankshaft 57, the purpose of which will be later explained, is journaled near its opposite ends in these bearing blocks 55 and 56. Chain sprockets 58 and 59 are mounted in side by side relationship on the crankshaft 57 and a chain 60 drivingly connects the chain sprocket 53 on the drive shaft 16 to the chain sprocket 59 to rotate the crankshaft 57 whenever the machine is propelled forwardly and a chain 61 connects the chain sprocket 58 on the crankshaft 57 to the chain sprocket 54 on the crankshaft 45, so that the crankshaft 45 is also rotated whenever the machine is forwardly propelled, and the beater plate 48 is given the forward and rearward swinging action described above.

The beater plate 48 has a rearwardly curved lower edge, as indicated at 62, and each of the adjustable length connecting rods 51 and 52 includes a tubular portion 63 pivotally connected at one end to the plate 48 by a connecting bracket, as indicated at 64 and 65, and a rod portion is journaled at one end on the corresponding crank of the crankshaft 45 and telescopically received, at its other end, in the tubular portion of the rod, the two portions of each rod being connected together by suitable means, such as the set screws 66 and 67 threaded through tapped holes in the tubular portions of the rods and bearing at their inner ends against the solid rod portions.

Secondary bars 70 and 71 are disposed at the outer sides of the bars 28 and 29 respectively, in spaced apart and substantially parallel relationship to these outer bars, and extend forwardly beyond the forward ends of the bars 28 and 29. The bars 70 and 71 are substantially coterminous at their rear ends with the bars 28 and 29 and the rear ends of the bars 70 and 71 are pivotally connected to the rear ends of the bars 28 and 29 by pivoted links 72 and 73 respectively, so that the bars 70 and 71 can move forwardly and rearwardly relative to the bars 28 and 29, the bars 70 and 71 being disposed above and generally parallel to the corresponding bars 28 and 29, as illustrated in Figure 1.

Bearing blocks 74 and 75 are mounted on the bars 70 and 71 respectively, near the forward ends of these bars and receive cranks 76 and 77 provided on the corresponding ends of the crankshaft 57, so that the front ends of the bars 70 and 71 are given a circular motion when the crankshaft 57 is rotated by forward propulsion of the device.

Arms 78 and 79 are pivotally connected intermediate their lengths to the bars 70 and 71 respectively at the front ends of the latter and depend therefrom. A second flat beater plate 80 of elongated, rectangular cross sectional shape is secured to the arms 78 and 79 below the forward ends of the bars 70 and 71 and is revolved about an axis extending longitudinally thereof when the crankshaft 57 is rotated. The arms 78 and 79 extend above the corresponding bars 70 and 71 and braces 81 and 82 are pivotally connected to the arms 78 and 79 at the upper ends of the latter and are adjustably connected to the bars 70 and 71 respectively, rearwardly of the front ends of these bars to support the arms 78 and 79 in adjusted positions of angularity relative to the bars 70 and 71.

With the above described arrangement, when the machine is propelled over a field of growing plants, such as alfalfa plants in bloom, the beater plate 48 is swung backwardly and forwardly and the beater plate 80, which is wider than, and disposed somewhat above the beater plate 48, is given a generally circular or rotating motion at a speed sufficient to impart sharp blows to the blooming plants. The blows imparted to the plants by the beater plate 80 move the upper portions of the plants into impact with the beater plate 48, so that the upper portions of the plants are quite thoroughly beaten as the machine is propelled over the field. The impact of the blossoms with the beater plates 80 and 48 causes the keel portions of the blossom corollas to rupture or split, so that the staminal columns can snap or flex out of the encasing keel to a position at which they are exposed for cross pollination to produce fertile seed.

The beater plates 80 and 48 both have flat surfaces contacting the plants, so that the plants and blossoms will not be cut or damaged by the beaters and the beater plate 80 has its lower edge forwardly curved, as indicated at 83, to protect the plants from damage by the bottom edge of this plate.

The plants are thus protected from damage and the force of the blows delivered by the beater plates 48 and 80, while sufficient to rupture the keel portions of the corollas of the plant blossoms, is not sufficient to materially damage the blossoms or sever them from the plants.

The modified arrangement of the device, as illustrated in Figures 8, 9 and 10, differs from the form of the device illustrated in Figures 1 to 7 inclusive, and described above, mainly in that the rear beater plate 48 is rigidly, though adjustably mounted on the device and is not moved by the forward propulsion of the machine.

In this arrangement, the frame 10, axle 11, wheels 12 and 13, gears 19 and 20, gears 21 and 22, drive shaft 16 and handle 42 are all the same as those illustrated in the first seven figures of the drawings and previously described.

The struts 31, 32, 33 and 34 are also provided and pivotally connected to the base in the manner described above, the rear struts 31 and 33 being interconnected by the cross brace 40 and connected by the link 41 to the hand lever 37 pivotally mounted on the frame and held in positions of angular adjustment relative to the frame by the toothed quadrant 39.

A bar 90 is pivotally connected to the struts 31 and 32 at the ends of these struts remote from the frame 10 and at spaced apart locations along the bar, and a complementary bar 91 is pivotally connected to the ends of the struts 33 and 34 remote from the frame at spaced apart locations along this bar. The struts 90 and 91 are offset intermediate their lengths outwardly away from each other, so that the space between the forward portions of these bars is at least as wide as the space between the wheels 12 and 13 of the machine.

Bearing blocks 92 and 93 are mounted on the bars 90 and 91 respectively forwardly of the connection of these bars with the struts 32 and 34 and a shaft 94 extends transversely of the space between the bars 90 and 91 and is journaled near its opposite ends in the bearing blocks 92 and 93. A belt pulley or chain sprocket 95 is mounted on the shaft 94 and connected by a chain or belt 96 with a chain sprocket or belt pulley 97 mounted on the drive shaft 16.

A double beater 98 is disposed between the forward ends of the bars 90 and 91 and journaled at its midwidth location on these bars by stub axles 99 and 100 projecting one from each end of the beater and journaled in bearing brackets 101 and 102 mounted on the bars 90 and 91 at the front ends thereof. Chain sprockets or belt pulleys 103 and 104 are mounted on the stub axles 99 and 100 respectively, at the outer sides of the bars 90 and 91 and connected by chains or belts 105 and 106 to chain sprockets or belt pulleys 107 and 108 mounted on the shaft 94, one at each end of the latter, so that the beater 98 is rotated about an axis substantially coincident with its longitudinal center line when the machine is forwardly propelled.

The edges of the beater 98 are curved in a direction away from the direction of rotation of the beater, as indicated at 109 and 110, so that the beater will not materially damage the plants or blossoms against which it rotates.

Arms 111 and 112 are pivotally connected at their upper ends to the bars 90 and 91 respectively, forwardly of and adjacent the shaft 94 and depend from the bars. A beater plate 113, similar to the beater plate 48, and having a rearwardly curved lower edge portion, is mounted on the arms 111 and 112 and extends transversely of the bars 90 and 91 below these bars and rearwardly of the rotatable beater 98.

Adjustable length links or struts 114 and 115, similar in construction to the struts 51 and 52, are connected between the bars 90 and 91 and the plate or baffle 113 to hold this plate in selected positions of angular adjustment relative to the bars 90 and 91.

The modified form of device operates in substantially the same manner as the form first described, the rotating beater 98 imparting blows to the blooming plants which drive the plants against the baffle 113, the succession of blows being of sufficient force to rupture the keel portions of the blossom corollas and release the staminal columns without materially damaging the blossoms or severing them from the plants. It is also understood that a rearrangement of these parts of the apparatus may be made so that the beaters are placed and the beating action performed behind the machine instead of in front of it as illustrated.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. Apparatus for treating plant blossoms while on the growing plants by imparting successive blows to the blossoms comprising a mobile frame, wheels supporting said frame, beaters disposed adjacent the front end of said frame in spaced apart and substantially parallel relationship to each other, means mounting said beaters on said frame for raising and lowering movements of adjustment of the beaters relative to the frame and for beating movements of the beaters relative to the frame, and means drivingly connecting said wheels to said beaters for moving the latter in a manner to impart successive blows to growing plants adjacent said frame.

2. Apparatus for treating plant blossoms while on the growing plants by imparting successive blows to the blossoms comprising a mobile frame, wheels supporting said frame, beaters disposed adjacent the front end of said frame in spaced apart and substantially parallel relationship to each other, means mounting said beaters on said frame for raising and lowering movements of adjustment of the beaters relative to the frame and for beating movements of the beaters relative to the frame, and means drivingly connecting said wheels to said beaters for moving the latter in a manner to impart successive blows to growing plants adjacent said frame, each of said beaters comprising a plate of elongated rectangular shape disposed at right angles to the longitudinal center line of said frame and having a rounded lower edge.

3. Apparatus for treating plant blossoms while on growing plants by imparting successive blows to the blossoms comprising a mobile frame, wheels supporting said frame, beater plates carried by said frame in spaced apart and substantially parallel relationship to each other and substantially perpendicular to the longitudinal center line of said frame, means supporting said beater plates on said frame for raising and lowering movements of the beater plates relative to the frame, and means drivingly connecting said wheels to at least one of said beater plates for moving the latter in a manner to impart successive blows to growing plants adjacent said frame.

References Cited in the file of this patent

UNITED STATES PATENTS

| Number | Name | Date |
| --- | --- | --- |
| 926,690 | Dennis | June 29, 1909 |
| 1,306,209 | Williams | June 10, 1919 |
| 1,438,803 | Williams | Dec. 12, 1922 |
| 1,866,219 | Nielsen | July 5, 1932 |
| 2,257,036 | Clark | Sept. 23, 1941 |
| 2,276,721 | Hartwick | Mar. 17, 1942 |